G. N. LIBBY.
PROCESS OF OXIDATION OF SULFIDS.
APPLICATION FILED FEB. 3, 1916.
1,323,879.
Patented Dec. 2, 1919.
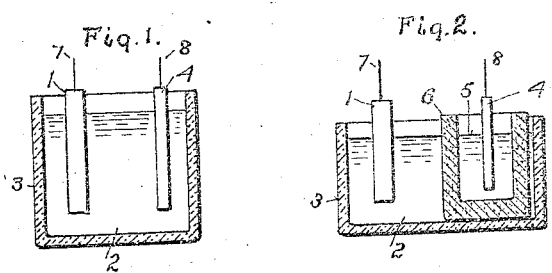
INVENTOR.
George Nelson Libby
BY Arthur P. Knight
ATTORNEY.

UNITED STATES PATENT OFFICE.

GEORGE N. LIBBY, OF BERKELEY, CALIFORNIA.

PROCESS OF OXIDATION OF SULFIDS.

1,323,879.  Specification of Letters Patent.  Patented Dec. 2, 1919.

Application filed February 3, 1916. Serial No. 76,005.

*To all whom it may concern:*

Be it known that I, GEORGE NELSON LIBBY, a citizen of the United States, and residing in the city of Berkeley, county of Alameda, State of California, have invented a new Process of Oxidation of Sulfids.

The process relates to the art of oxidation of mineral sulfids or sulfid ores, consisting of water-insoluble solid sulfids, and has for its object not only to render the ore amenable to hydro-metallurgical treatment for metal recovery, but also to secure the energy of oxidation as electricity.

It has been well known that mineral sulfids may function as electrodes but heretofore it has been considered that sulfids, especially pyrite function principally as insoluble electrodes, i. e. a mineral sulfid like pyrite takes its electrical charge, primarily not from its own decomposition but from the nature of the solution surrounding it, just as does the unattacked electrode platinum. This is the case in acid solutions such as have heretofore been used in hydrometallurgical treatments, but I have demonstrated that in an alkaline solution these sulfids function entirely as decomposing electrodes and in no way resemble platinum or other unattackable electrodes.

In my method for the oxidation of pyrite or other conducting sulfids I employ them as an anode in an alkaline solution such as sodium hydrate or calcium hydrate. This constitutes the half cell consisting of solid mineral sulfid in a solution of an alkali sulfid. The oxygen may be supplied by electro-decomposition of the solution with the sulfid as an anode or it may be supplied by opposing the above half cell by any half cell having a higher electro-motive force, *i. e.*, one that is more electropositive. However, I prefer to use one whose used oxygen may be replaced by oxygen from the air. Such a depolarizer is concentrated nitric acid surrounding an unattacked electrode, such as metallic iron.

The battery thus constituted is of the well known Bunsen type but is novel in the use of a mineral sulfid in an alkaline solution as an anode.

The accompanying drawings illustrate cell constructions adapted for carrying out my invention, and referring thereto:—

Figure 1 is a vertical section of a simple cell adapted for oxidation of the sulfid ore by electrolysis of the alkaline electrolyte.

Fig. 2 is a vertical section of a cell comprising two half cells in electrolytic conductive connection, one of said half cells comprising the mineral sulfid as anode, in an alkaline electrolyte, and the other half cell comprising an unattacked cathode in a depolarizing solution.

In Fig. 1, the solid water-insoluble mineral sulfid (sulfid ore) constitutes the anode 1 in contact with an alkaline electrolyte 2, contained in a vessel 3. The cathode 4 may be of any suitable material. On electrolysis of the alkaline electrolyte by current passing therethrough and through the electrodes 1 and 4, the sulfid may be oxidized. I prefer however to carry out the operation by a cell construction, for example, such as shown in Fig. 2, in which the cathode 4 is of positive potential relative to the anode 1, by reason of the chemical relations or actions in the cell, so as to generate electrical energy by the oxidation of the sulfid anode, and for this purpose I prefer to use a cathode 4 of metallic iron in a depolarizing solution, indicated at 5, preferably nitric acid, or other substance capable of reduction to a lower state of oxidation by cathode action, and of more or less complete reoxidation to its original condition by the action of atmospheric air. The cathode half cell consisting of iron in nitric acid solution is separated from the anode half cell, consisting of mineral sulfid in alkaline solution, by any usual means for restraining or resisting diffusion of the constituents of the solutions while maintaining electrolytic conductive connection; for example, a porous separator member such as indicated at 6. The electrodes 1 and 4 may be connected to wires 7 and 8 for conducting current, either from an external source, in the case of the form shown in Fig. 1, or to an external consuming device, in the case of the form shown in Fig. 2.

The action of the half cell, consisting of the unattacked electrode in nitric acid, is fairly well known, resulting in the formation of $NO_2$ which oxidizes readily with O and $H_2O$ to the original $HNO_3$ decomposed. I have found the action of the half cell, consisting of solid mineral sulfid in a solution of an alkali sulfid, to result in the oxidation of the sulfur and metal; thus pyrite $FeS_2$ in NaOH yields $Fe(OH)_3$ and $Na_2SO_4$ with the production of nearly the theoretical quantity of electricity that would be expected from the usual calculation by means of the heats of formation.

Having thus described my invention, what I claim as new, and desire to secure by Letters Patent is:—

1. The process of oxidation of a water-insoluble mineral sulfid, which consists in maintaining the same in contact, as an anode, with an electrolyte consisting of an aqueous solution of an alkali and causing current to pass through said anode and electrolyte so as to oxidize the mineral sulfid by electrolytic action.

2. The process of oxidation of a water-insoluble solid mineral sulfid, which consists in maintaining the same in contact with an alkaline solution, and maintaining in electrolytic conductive connection with such solution, an electrode which is electropositive relative to said mineral sulfid when the latter is in contact with alkaline electrolyte, so as to cause said mineral sulfid to act as an anode and to be oxidized by electrolytic action.

3. The process of oxidation of a water-insoluble mineral sulfid with resultant generation of electric current, which consists in exposing such sulfid as an anode, to contact with an alkaline electrolyte and maintaining in electrolytic conductive connection with said alkaline electrolyte a cathode in a depolarizing solution capable of regeneration by oxygen, and exposing said depolarizing solution to contact with oxygen.

4. The process of oxidation of a water-insoluble mineral sulfid with resultant generation of electrical current, which consists in exposing such sulfid as an anode in an alkaline electrolyte, maintaining a cathode in electrolytic conductive connection with said electrolyte, depolarizing said cathode by the action of a depolarizing agent capable of regeneration by oxygen and regenerating said depolarizing agent by the action of oxygen.

5. The process of oxidation of a solid mineral sulfid which consists in exposing it, as an anode, is an alkaline electrolyte, maintaining in electrolytic conductive connection with said electrolyte, a cathode in contact with nitric acid solution and exposing said solution to contact with oxygen.

GEORGE N. LIBBY.

Witnesses:
NATHAN NULTING,
C. L. PORTER.